United States Patent
Wang

(10) Patent No.: US 10,578,815 B1
(45) Date of Patent: Mar. 3, 2020

(54) RADIATION RESISTANT FIBER OPTICAL ASSEMBLY

(71) Applicant: Northrop Grumman Systems Corporation, Falls Church, VA (US)

(72) Inventor: Ge Wang, Los Alamitos, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/536,035

(22) Filed: Aug. 8, 2019

Related U.S. Application Data

(62) Division of application No. 16/027,532, filed on Jul. 5, 2018, which is a division of application No. 15/659,835, filed on Jul. 26, 2017, now Pat. No. 10,088,641.

(51) Int. Cl.
*G02B 6/42* (2006.01)
*G02B 6/00* (2006.01)
*H01S 3/067* (2006.01)
*H01S 3/102* (2006.01)

(52) U.S. Cl.
CPC ......... *G02B 6/4266* (2013.01); *G02B 6/4246* (2013.01); *G02B 6/4251* (2013.01); *G02B 6/4286* (2013.01); *H01S 3/06704* (2013.01); *H01S 3/1028* (2013.01); *H01S 3/06716* (2013.01); *H01S 3/06754* (2013.01)

(58) Field of Classification Search
CPC .................................... G02B 6/42; G02B 6/00
USPC .......................................................... 385/31
See application file for complete search history.

(56) References Cited

U.S. PATENT DOCUMENTS

| | | | | |
|---|---|---|---|---|
| 4,626,068 A | * | 12/1986 | Caldwell | G02B 6/443 250/458.1 |
| 5,043,285 A | * | 8/1991 | Surgi | G01N 21/6428 250/458.1 |
| 5,178,153 A | * | 1/1993 | Einzig | A61B 5/0261 356/477 |
| 5,423,320 A | * | 6/1995 | Salzman | A61B 5/1459 600/473 |
| 5,851,450 A | * | 12/1998 | Rennie | C03C 25/106 264/1.28 |
| 5,892,861 A | * | 4/1999 | Le Febre | G02B 6/02 250/227.11 |
| 6,468,433 B1 | * | 10/2002 | Tribelski | A01M 1/226 210/748.06 |

(Continued)

*Primary Examiner* — Kaveh C Kianni
(74) *Attorney, Agent, or Firm* — McCracken & Gillen LLC

(57) ABSTRACT

An optical amplifier is provided in which radiation levels experienced by an optical fiber are minimized. A sealed enclosure houses an optical fiber. An input optical signal enters on end of the fiber and an amplified output optical signal exits the other end of the optical fiber. Small particles embedded with a gas fill the interior of the enclosure. An optical pump supplies an amplification laser beam coupled to one of the ends of the optical fiber. Due to energy supplied by the amplification laser beam, the input optical signal is amplified upon exiting the optical fiber. At least a portion of the gas embedded in the small particles is released inside the enclosure when the small particles are subjected to heat to provide a gaseous interior in the enclosure that minimizes radiation levels experienced by the optical fiber due to external radiation.

10 Claims, 1 Drawing Sheet

(56) References Cited

U.S. PATENT DOCUMENTS

| | | | |
|---|---|---|---|
| 2002/0154874 A1* | 10/2002 | Ahrens | C03B 19/1453 385/123 |
| 2006/0290925 A1* | 12/2006 | Nomine | G01N 21/68 356/316 |
| 2010/0278722 A1* | 11/2010 | Field | C01B 3/0005 423/648.1 |
| 2015/0141843 A1* | 5/2015 | Eberle | A61B 5/02154 600/478 |
| 2016/0097872 A1* | 4/2016 | Fernihough | G01P 15/18 367/15 |

* cited by examiner

RADIATION RESISTANT FIBER OPTICAL ASSEMBLY

CROSS REFERENCE TO RELATED APPLICATIONS

The present application is a divisional application of U.S. patent application Ser. No. 16/027,532, filed Jul. 5, 2018, entitled "RADIATION RESISTANT FIBER OPTICAL ASSEMBLY", which is a divisional application of U.S. patent application Ser. No. 15/659,835, filed Jul. 26, 2017 (now U.S. Pat. No. 10,088,641, issued Oct. 2, 2018), entitled "RADIATION RESISTANT FIBER OPTICAL ASSEMBLY", the entire contents of which are incorporated herein by reference.

BACKGROUND

This invention relates to fiber optic amplifiers that must operate in environments subject to exposure to significant radiation.

Fiber optic amplifiers have been used in various applications, e.g. telecommunication in trans-ocean optical fibers. The principle of signal amplification is based on solid state quantum effects where a high power pump laser beam causes electron population inversion in the fiber energy bands and the stimulated photon emission amplifies the incoming optical signal. To match the energy levels in the optical fiber with pump laser, optical fibers may be doped with rare earth materials, e.g. erbium, ytterbium, etc. The doped rare earth elements generate multiple new energy bands in the glass fiber. The photonic energy from a short wavelength pump laser excites charge carriers and leads to population inversion in the energy levels corresponding to the short wavelength photons. Upon stimulation by an incoming laser that carries data packets, the charge carriers undergo an emission of photons giving rise to amplification of the incoming laser carrying the data packets.

Fibers doped with rare earth elements darken when subjected to significant radiation levels, e.g. outer space, causing degradation of optical amplification and an increase in optical amplifier's noise figure. Although attempts to produce special fibers developed to better tolerate radiation have been made, these special fibers tend to lose their amplification efficiency. There exists a need for an improved way to reduce degradation of rare earth-doped optical fiber due to radiation exposure.

SUMMARY

It is an object of the present invention to satisfy this need.

An exemplary optical assembly and optical amplifier using the assembly are provided in which radiation levels experienced by an optical fiber are minimized. A sealed enclosure houses an optical fiber. An input optical signal enters one end of the fiber and an amplified output optical signal exits the other end of the optical fiber. Small particles embedded with a gas fill the interior of the enclosure. An optical pump supplies amplification laser beam coupled to one of the ends of the optical fiber. Due to energy supplied by the amplification laser beam, the input optical signal is amplified upon exiting the optical fiber. At least a portion of the gas embedded in the small particles is released inside the enclosure when the small particles are subjected to heat to provide a gaseous interior in the enclosure that minimizes radiation levels experienced by the optical fiber due to external radiation.

An exemplary method minimizes radiation levels experienced by an optical fiber that must operate in an environment containing radiation. The method includes disposing a length of optical fiber in an enclosure where the optical fiber has first and second ends; the enclosure also enables the coupling of input and output optical signals to the respective first and second ends of the length of optical fiber. Gas is infused under high pressure into small particles coated with a resilient material that is permeable to the gas. The interior of the enclosure not occupied by the optical fiber is filled with the gas infused particles and the enclosure is sealed. Heat is controllably supplied to heat the small particles so that at least a portion of the gas embedded in the small particles is released inside the enclosure to provide a gaseous interior environment in the enclosure that minimizes radiation levels experienced by the optical fiber due to external radiation.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the difficulties associated with the use of a gas, e.g. hydrogen or deuterium, which fills an enclosure to provide protection for an enclosed optical fiber against radiation due to the optical fiber being surrounded by the gas which reduces the darkening of the fiber. This typically requires the use of a hydrogen storage tank coupled to the enclosure. The tank fills and maintains a level of gaseous hydrogen around the fiber to account for leakage and loss of some of the hydrogen over time. However, requiring a hydrogen storage tank is a substantial burden in weight, reliablility and safety. These burdens are especially troublesome where the optical fiber is part of a payload to be launched into space for operation and the likelihood of leakage of the gas from the enclosure is high given a very low pressure external environment, i.e. the vacuum of space.

Figure 1:
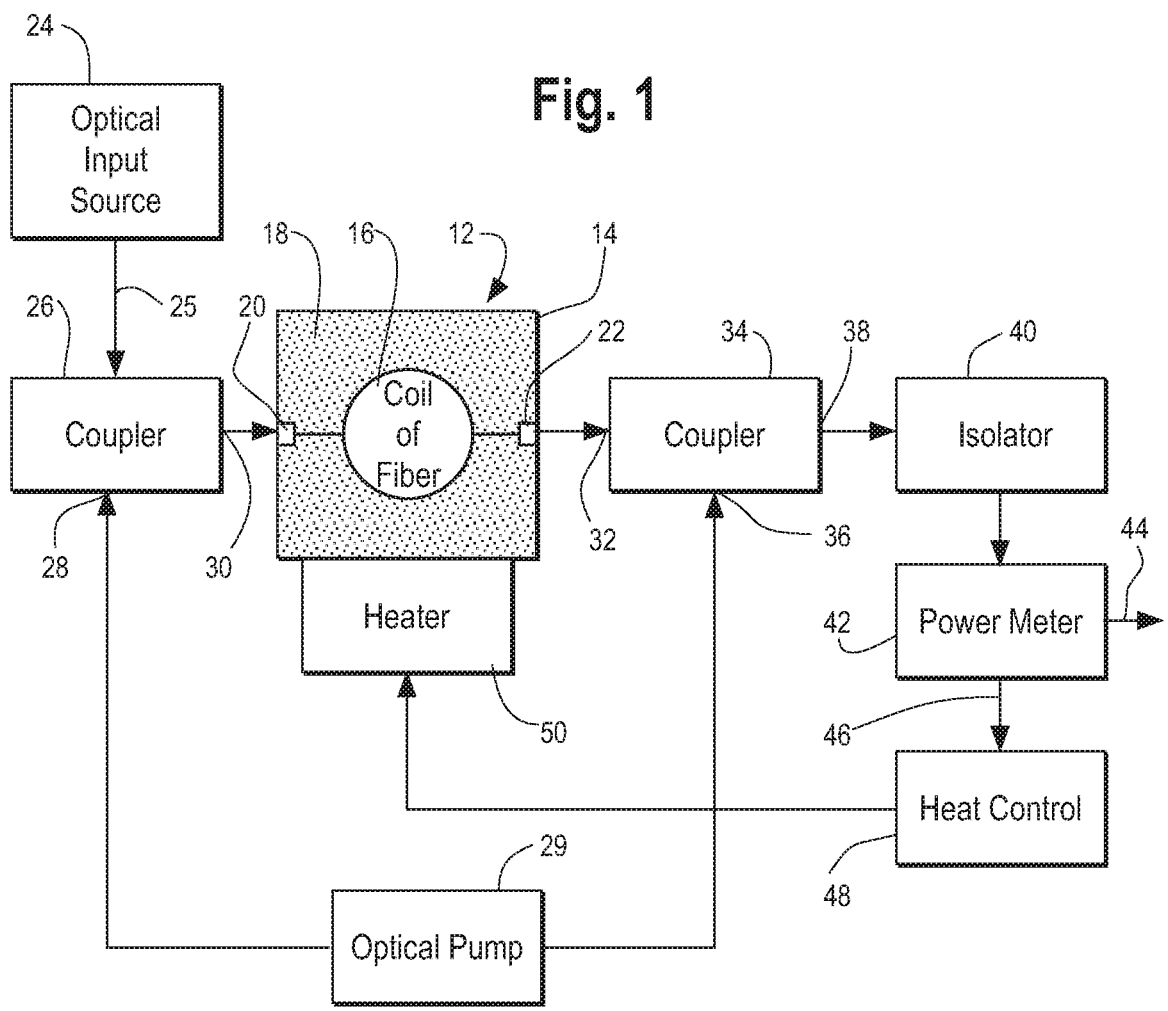
FIG. 1 is a block diagram of an exemplary optical fiber amplifier in accordance with an embodiment of the present invention.

FIG. 1 shows a block diagram of an exemplary optical fiber amplifier 10 in accordance with an embodiment of the present invention in which protection against the effects of radiation is provided without requiring an external gas supply. An optical fiber assembly 12 includes an enclosure 14, rare-earth doped optical fiber, e.g. an optical fiber doped with erbium, ytterbium, etc., wound into a coil 16, and a plurality of particles 18 that substantially fills the space within enclosure 14 not occupied by the optical fiber. In this illustrative example, the rare-earth used is erbium. The enclosure 12 includes an entry port 20 and an exit port 22 which provides a hermetic seal while allowing the optical fiber to enter and exit the enclosure. The enclosure 12 may be made of an austenitic stainless steel. The end plates (entry and exit ports) may be made of a metallic material with low coefficient of thermal expansion, e.g., an iron-nickel alloy, in order to match with a glass seal of hermetic connectors. The end plates can be either fusion welded or brazed to the austenitic stainless steel enclosure. An optical input source 24, e.g. a laser modulated with data, provides a signal 25 that is coupled as an input to a coupler 26. Another port 30 of coupler 26 carries the signal 25 that is advancing towards assembly 12 and the optical energy provided by optical pump 29. Port 28 of the coupler 26 carries the optical energy generated by the optical pump 29.

The coupler 34 includes a port 32 which carries signal 25 moving away from the enclosure 14 after being amplified primarily within enclosure 14 and the energy from optical pump 29 that is advancing towards the enclosure 14. Port 36 of coupler 34 receives the optical energy from optical pump 29 which supplies energy providing for the application of signal 25. Port 38 of coupler 34 carries the amplified signal 25 which is provided as an input to the optical isolator and filter 40 which in turn provides an output signal that is provided as an input to power monitor 42 before being coupled as a final amplified optical output signal 44. A control signal 46 from the power monitor 42 corresponding to the level of the amplified signal 44 is provided to the heat controller 48 which controls the amount of current that flows through heating element 50 that is, in this example, attached to the outside of the enclosure 14.

The principle of signal amplification is based on solid state quantum effects where a high power pump laser beam causes electron population inversion in the fiber energy bands and the stimulated photon emission amplifies the incoming optical signal. To match the energy levels in the optical fiber with pump laser, rare-earth doped optical fibers are used. The doped rare-earth elements generate multiple new energy bands in the glass fiber. The photonic energy from a short wavelength pump laser excites charge carriers and leads to population inversion in the energy levels corresponding to the short wavelength photons. Upon stimulation by an incoming laser signal that carries data packets, the charge carriers undergo a stimulated emission of photons and gives rise to amplification of the incoming laser signal.

The particles 18 may be powders of palladium with sufficiently small size, e.g. 50 to 200 micrometers, that are preferably coated with a thin, e.g. 10 to 20 micrometers, gas permeable coating, e.g. silicone or urethane coating. The coated powders are charged at high pressure, e.g. 10 to 100 atmospheres, with a suitable gas that can provide radiation protection, e.g. hydrogen or deuterium, at a temperature 25 C-200 C. Assuming that palladium is used, it can absorb approximately 2700 times the amount of hydrogen of its own volume. Hence, there is more than enough supply of hydrogen available from these particles. The protective effect is believed to be chemical based. As long as there is hydrogen gas presence inside the enclosure, there will be sufficient hydrogen diffused into the optical fibers to substantially prevent or clear darkening of the fiber due to space radiation. After gas loading, the powders are then filled into the space inside the hermetic enclosure 14 not occupied by the fiber 16. The soft silicone or urethane coating on the powders allow the powders to directly contact otherwise sensitive erbium doped optic fiber without introducing hard points or acute inflections to the fibers that could cause signal loss/degradation due to micro bending. The hermetic enclosure 14 is then sealed by the end plates. The heater 50, instead of being attached on to the outside surface of the enclosure 14, could also be embedded in the walls of the enclosure 14 or disposed inside the enclosure as long as it does not interfere with the optical fiber or optical amplification. In a space missions, the heater can be powered to allow the doped fiber to reach a controlled temperature of 70 C to 140 C so that the embedded gas, e.g. gaseous hydrogen, is released from the particles which act as storage media for the gas. In such an application, the heater can be turned off during most of the time of the mission and only turned on as required when it is detected that the level of amplification has dropped below a predetermine level because of space radiation.

Figure 2:
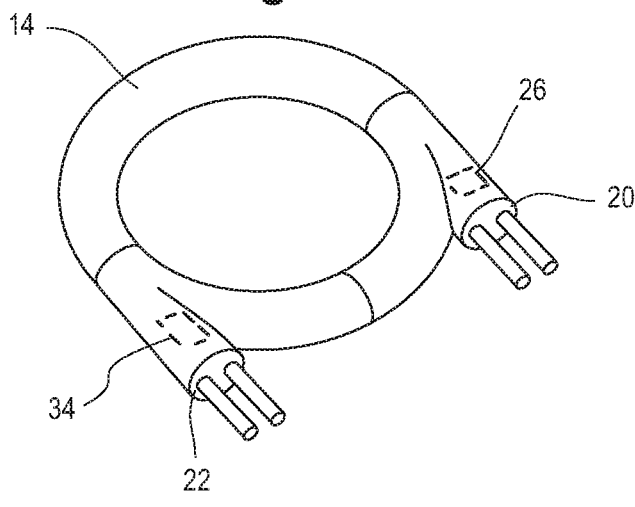
FIG. 2 illustrates an enclosure that holds a coiled length of rare-earth doped optical fiber and protective particles in accordance with an embodiment of the present invention.

FIG. 2 illustrates the exemplary enclosure 14 that holds a coiled length of rare-earth doped optical fiber 16 and particles 18 embedded with gas that, when released, provides radiation protection in accordance with an embodiment of the present invention. In this embodiment the entry and exit couplers 26, 34 are internal to the enclosure 14. Even though the ports 20, 22 are intended to provide a hermetic seal, it is very difficult to prevent some amount of long term leakage of a highly permeable gas such as hydrogen especially in the lower pressure environment of space.

Figure 3:
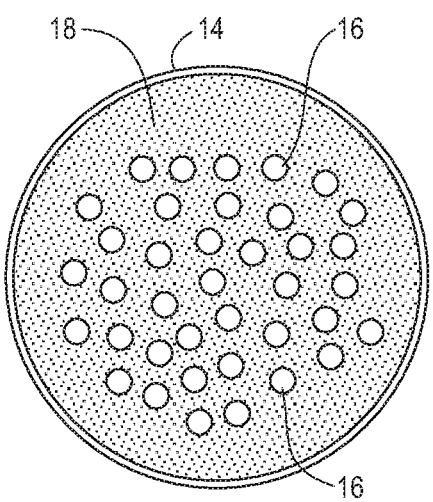
FIG. 3 is a representative cross-sectional view of the enclosure showing the coiled optical fiber surrounded by the protective particles.

FIG. 3 is a representative cross-sectional view of the exemplary enclosure 14 showing the coiled optical fibers 16 surrounded by the protective particles 18. When the protective particles 18 are heated as explained above, the gas embedded in the particles escapes through the gas permeable coating on each particle to fill the vacant interior space of enclosure 14 with gas which minimizes the effects of external radiation upon the contained fibers. The particles 18 also provide the coil 16 of optical fiber a cushion against shock and vibration which would be experienced during the launch of a space vehicle carrying the optical amplifier 10.

Although exemplary implementations of the invention have been depicted and described in detail herein, it will be apparent to those skilled in the art that various modifications, additions, substitutions, and the like can be made without departing from the spirit of the invention. For example, other hydrogen storage materials may be used for making the particles. These materials include but are not limited to graphite, carbon nanotubes, Zeolites, metal organic frameworks, organic polymers, metal hydrides, complex hydrides, Amides, Imides and Mixtures, Clathrate Hydrates, and a combination thereof. A different hydrogen or deuterium loading procedure may be used based on the hydrogen storage material selected. Pump lasers may be integrated into the hermetic enclosure. As such, the number of hermetic fiber connectors can be reduced and replaced with hermetic multipin electrical connectors that provide electrical power to the pump laser and the thermal electric cooler inside the pump laser modules. If the pump laser modules become part of the hermetic enclosure, the material of the enclosure should be selected from materials with high thermal conductivity so that the enclosure becomes a heat sink for the pump laser when properly mounted to a supporting baseplate.

The scope of the invention is defined in the following claims.

The invention claimed is:

1. An assembly for minimizing radiation levels experienced by an optical fiber comprising: a sealed enclosure; a length of optical fiber disposed in the enclosure and having first and second ends; at least one port on the enclosure that enables the coupling of input and output optical signals to the respective first and second ends of the length of optical fiber; a plurality of small particles disposed within the interior of the enclosure, the plurality of small particles having embedded therein a gas which, when released, reduces the effects of radiation upon the optical fiber;

a controller;

at least a portion of the gas embedded in the small particles being released by the controller upon the small particles being subjected to heating to fill the inside the enclosure and provide a gaseous interior environment totally surrounding the length of the optical fiber, the gas from the small particles providing a gaseous interior environment in the enclosure that reduces the effects of radiation from all directions upon the optical fiber due to radiation for a source external to the enclosure.

2. The assembly of claim 1 wherein each of the small particles is covered by a thin resilient coating that is permeable to the gas.

3. The assembly of claim 1 wherein the gas comprises at least one of hydrogen and deuterium and the small particles comprise palladium.

4. The assembly of claim 1 further comprising:

an optical input source that supplies an input optical signal coupled to the first end of the optical fiber;

an optical pump that supplies an amplification laser beam coupled to one of the first and second ends of the optical fiber;

the input optical signal being amplified upon exiting the second end of the optical fiber due to energy provided by the amplification laser beam which exits the other of the first and second ends of the optical fiber.

5. The assembly of claim 4 further comprising:

a monitor that monitors the power level of the amplified optical signal;

a heating element disposed to supply heat to the plurality of small particles to induce the release of gas embedded therein;

a heat controller, coupled to the heating element, that controls when heat is supplied by the heating element;

the monitor providing an output control signal coupled to the heat controller that controls when the heating element generates heat in order to maintain the power level of the amplified optical signal.

6. A method for minimizing radiation levels experienced by an optical fiber comprising the steps of:

sealing a length of the optical fiber in an enclosure where the optical fiber has first and second ends;

coupling input and output optical signals to respective first and second ends of the length of optical fiber;

embedding a gas into a plurality of small particles that are disposed within an interior of the enclosure, the gas which, when released, reduces the effects of radiation upon the optical fiber;

subjecting the small particles to heat that causes at least a portion of the gas embedded in the small particles to be released to fill the inside the enclosure and provide a gaseous interior environment totally surrounding the length of the optical fiber, the gas from the small particles providing a gaseous interior environment in the enclosure that reduces the effects of radiation from all directions upon the optical fiber due to radiation for a source external to the enclosure.

7. The method of claim 6 further comprising covering each of the small particles by a thin resilient coating that is permeable to the gas.

8. The method of claim 6 wherein the gas comprises at least one of hydrogen and deuterium and the small particles comprise palladium.

9. The method of claim 6 further comprising the steps of:

supplying a laser beam with an input optical signal coupled to the first end of the optical fiber;

using an optical pump to amplify the laser beam which is coupled to the first end of the optical fiber so that the input optical signal is amplified upon exiting the second end of the optical fiber due to energy provided by the optical pump.

10. The method of claim 9 further comprising the steps of:

monitoring the power level of the amplified optical signal;

controlling the application of heat to the plurality of small particles to induce the release of gas embedded therein in response to the monitoring to maintain the power level of the amplified optical signal.

* * * * *